United States Patent Office 3,198,769
Patented Aug. 3, 1965

---

3,198,769
LINEAR 1,3-CYCLOPENTANEDIMETHANOL POLYESTERS OF BIS-PHENYLENE - 4,4' - DICARBOXYLIC ACIDS
Arthur R. Macon, Kinston, N.C., assignor to E. I. du Pont de Nemours and Company, Wilmington, Del., a corporation of Delaware
No Drawing. Filed Aug. 28, 1962, Ser. No. 220,032
9 Claims. (Cl. 260—75)

This invention is concerned with a novel class of linear polyesters and fibers, films, and other shaped articles produced therefrom.

Numerous synthetic linear condensation polyesters have been prepared and evaluated in the form of fibers in an effort to obtain fiber properties superior to those of polyethylene terephthalate, the first commercially successful polyester fiber. Although polyesters exhibiting improved properties in certain respects have been found, extensive evaluations of the polyesters tested hitherto have generally shown that they also possess deficiencies in one or more aspects important for commercial acceptance. Exceptional performance of the fibers for use in "wash-and-wear" garments has been an important goal. Fabrics adaptable for making garments of this type are characterized by relative freedom from wrinkling after laundering, so that little or no ironing of the garments is required. However, the fibers must also possess good stability to cleaning agents, heat, and light. As a practical matter, the bulk polymeric material must also be capable of being processed readily under commercial conditions to uniform fibers of the desired properties. In the case of polyesters, this normally means that the polymer must be capable of being melt-spun within a practical temperature range of about 200° to about 325° C. to produce filaments readily drawable to oriented, tenacious fibers.

It is an object of this invention to provide a novel polyester which can be melt extruded to provide orientable fibers of moderate crystallinity characterized by good tensile strain recovery properties, resistance to photodegradation, and relative insensitivity to common solvents. Other objects will become apparent from the following description and claims.

In accordance with the present invention, it has been found that the desired properties are exhibited by the class of polymers comprising polyesters of 1,3-cyclopentanedimethanol,

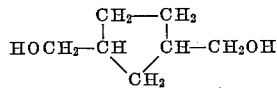

and a bis-phenylene-4,4'-dicarboxylic acid of 8 to 14 carbon atoms which is essentially hydrocarbon except for the two carboxyl groups, but may include other groupings inert in polyesterification reactions. More specifically, the invention comprehends novel synthetic linear condensation polyesters characterized by recurring units having the structural formula:

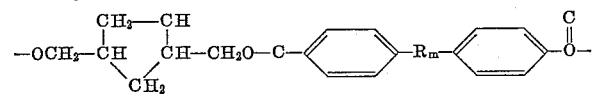

wherein R is a member of the group consisting of

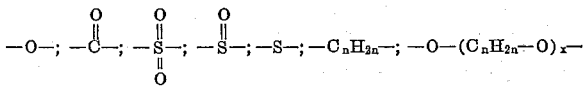

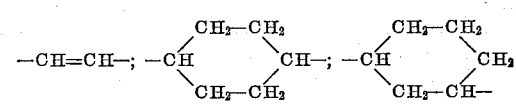

and

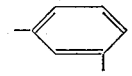

$m$ is 0 or 1; $n$ is an integer in the range 1 to 6; $x$ is 1 or 2; and the divalent hexagons represent phenylene radicals which may be substituted with halogen, alkyl groups containing up to 4 carbon atoms, or other substituents which are inert in a polyesterification reaction medium.

The starting material dicarboxylic acids from which the polyesters are prepared are defined herein as bis-phenylene-4,4'-dicarboxylic acids; i.e., aromatic dicarboxylic acids comprising two p-carboxyphenyl radicals linked together directly or through an intervening radical other than an ester radical. The acids may be in the form of their ester-forming derivatives, i.e., their carbonyl halides, anhydrides, salts, or esters, particularly their esters with the lower aliphatic alcohols or with phenol. 4,4'-bibenzoic acid is an example of a bis-phenylene-4,4'-dicarboxylic acid which may be used with 1,3-cyclopentanedimethanol to form polyesters; and this acid is indeed particularly preferred for the purpose of producing polyesters suitable for spinning textile filaments having exemplary characteristics for making "wash-and-wear" fabrics. Other examples of suitable bis-phenylene-4,4'-dicarboxylic acids include bis-4-carboxyphenyl ether, bis-4-carboxyphenyl ketone, bis-4-carboxyphenyl sulfone, bis-4-carboxyphenyl sulfoxide, bis-4-carboxyphenyl sulfide, bis(4-carboxyphenyl)methane, 1,1- and 1,2-bis(4-carboxyphenyl)ethane, 2,2-bis(4-carboxyphenyl)propane, bis(4-carboxyphenoxy)ethane, bis(4 - carboxyphenoxy)butane, bis(4-carboxyphenoxyethyl)ether, 4,4'-stilbenedicarboxylic acid, 1,3- and 1,4-bis(4-carboxyphenyl)cyclohexane, and the m- and p-terphenyl-4,4''-dicarboxylic acids. Other obvious equivalents may be employed such as bis-phenylene-4,4'-dicarboxylic acids wherein the phenylene radicals carry substituents which are inert in the polyesterification reaction. For example, the phenylene radicals may be substituted with methyl or other lower alkyl radicals, halogen substituents, and the like. Examples of such suitable acids include 2,2'- and 3,3'-dimethyl-4,4'-bibenzoic acid, 2,2'-dibromo-4,4'-bibenzoic acid, etc.

In general, at least about 75 mol percent of the esterified dicarboxylic acids in the polyester should be of the designated class of bis-phenylene-4,4'-dicarboxylic acid compoects. However, mixtures of dicarboxylic acids may be employed to form copolyesters. Up to about 25 mol percent of a dicarboxylic acid of a different class may be present, such as terephthalic acid, hexahydroterephthalic acid, sebacic acid, isophthalic acid, or other suitable dicarboxylic acids.

The polyesters of the invention are prepared by reacting a bis-phenylene-4,4'-dicarboxylic acid or an ester-forming derivative thereof, as described above, with 1,3-cyclopentanedimethanol or an ester-forming derivative of this glycol. By an ester-forming derivative of 1,3-cyclopentanedimethanol is meant a derivative of 1,3-cyclopentanedimethanol containing functional groups equivalent to the hydroxyl groups in their ability to react with carboxyl groups, such as esters of the glycol with acetic acid or other lower aliphatic acids.

The preparation and properties of 1,3-cyclopentanedimethanol have been discussed by Birch et al. in J. Chem. Soc. 1953, p. 2477, as well as by Perry in J. Org. Chem. 24, 829 (1959). The glycol exists in two forms, cis- and trans-. In preparing the polyesters of the present invention, it has been found that valuable polyesters are formed by employing as a starting material either form of the glycol alone or a mixture of the two forms. As used herein, the term "1,3-cyclopentanedimethanol" thus applies to the glycol without regard to the relative proportion of the cis- and trans-forms, except where a specific designation is given.

In accordance with the present invention it has been observed that both the cis- and trans-forms of this alicyclic glycol, perhaps because of the structural rigidity conferred by the five-membered ring, form valuable polyesters with the class of bis-phenylene-4,4'-dicarboxylic acids.

A convenient method for preparing the polymers of the invention involves reaction of an alkyl ester of the starting material dicarboxylic acid with 1,3-cyclopentanedimethanol in an ester-interchange reaction followed by polycondensation at high temperature and at low partial pressure of the glycol, until a polymer of the desired molecular weight is produced. In carrying out the ester interchange reaction, at least one molecular proportion of 1,3-cyclopentanedimethanol per molecular proportion of the dicarboxylic ester should be used, preferably about 1.5 to 2.1 mols of the glycol per mol of the ester. It is desirable to employ an ester of the dicarboxylic acid formed from an alcohol or a phenol with a boiling point considerably below that of 1,3-cyclopentanedimethanol so that the former can be removed easily from the reaction zone by distillation. It is preferred to use the methyl or ethyl esters, as these esters are formed from alcohols which, because of their relatively low boiling points, are easily separated by distillation from the glycol. Heating should be above the melting point of the reaction mixture and above the boiling point of the alcohol or phenol to be displaced. Heating should be effected under conditions such that the displaced alcohol or phenol can be removed from the reaction zone, usually by means of conventional distillation equipment. The heating is usually at atmospheric pressure, but higher or lower pressures may be used if desired. The ester interchange reaction is advantageously carried out in the presence of ester interchange catalysts such as manganese acetate, calcium acetate, litharge, sodium methoxide, sodium hydrogen hexabutoxy-titanate, tetra-alkyl titanates such as tetraisopropyl titanate, or other suitable ester interchange catalysts as described in the literature relating to preparation of polyesters.

Following the ester interchange reaction, heating is continued under reduced pressure until the excess glycol is removed and the polymerization reaction has proceeded to the desired degree. The final stages of polymerization may be carried out with polymer in the molten state or, if desired, the reaction may be completed by solid phase polymerization. The polymerization reaction may be carried out in the presence of catalysts such as antimony trioxide, litharge, zinc acetate, or other suitable polycondensation catalysts as described in the literature. Sodium hydrogen hexabutoxytitanate and the tetra-alkyl titanates such as tetraisopropyl titanate are examples of catalysts which may be used for both the ester interchange and polymerization steps.

As used herein, the term "polyester" is intended to include not only homopolyesters but also polyesters, terpolyesters, and the like.

While the preferred embodiment of the invention comprises polyesters in which all, or substantially all (i.e., greater than 90%), of the recurring structural units consists of 1,3-cyclopentanedimethanol esters of bis-phenylene-4,4'-dicarboxylic acids, it is to be understood that the invention also comprises polyesters in which residues of other hydroxy compounds are present. In general, at least about 75 mol percent of the hydroxy component of the polyester should be 1,3-cyclopentanedimethanol, although of course smaller proportions can be employed. By "hydroxy component" of the polyester is meant the sum of all of the hydroxy-substituted compounds which would be formed by hydrolysis of the carbonyloxy linkages in the polymer chain. The remainder of the hydroxy component of the polyester, up to about 25 mol percent, may be any suitable dihydroxy compound or hydroxy-carboxylic acid. Examples of such compounds include ethylene glycol, propylene glycol, butylene glycol, 2,2-dimethylpropylene glycol, 2-methyl-2-ethylpropylene glycol, 2-methyl-2-propylpropylene glycol, 2,2,3,3,4,4-hexafluoro-1,5-pentanediol, hexamethylene glycol, decamethylene glycol, diethylene glycol, ethylene thiodiglycol, cis-, or trans-hexahydro-p-xylylene glycol, cis- or trans-quinitol, decahydro-1,4-, -1,5-, -2,6-, or -2,7-bis(hydroxymethyl)naphthalene, 1,1-bis(hydroxymethyl)cyclohexane, 1,4-bis(2-hydroxyethyl)benzene, 1-4-bis(2-hydroxyethoxy)benzene, 4-(2-hydroxyethyl)benzoic acid, and 4-(2-hydroxyethoxy)benzoic acid.

The remainder of the hydroxy component may also be a dihydric phenol. A convenient method of preparing such copolyesters involves (A) preparation of a homopolyester of 1,3-cyclopentanedimethanol and a bis-phenylene-4,4'-dicarboxylic acid, (B) preparation of a homopolyester of the dihydric phenol with the dicarboxylic acid, e.g., by reacting the dihydric phenol with the diphenyl ester of the acid in the presence of sodium acetate as a catalyst, and (C) melt blending the glycol polyester and the dihydric phenol polyester in the desired proportions under an atmosphere of nitrogen. The blended mixture initially forms a block copolyester, but if the mixture is held an hour or so in the melt the copolyester becomes random. The catalysts present in the homopolyester also serve as catalysts for the randomization of the copolyester. Suitable dihydric phenols for the preparation of such copolyesters include hydroquinone, resorcinol, 4,4'-dihydroxybiphenyl, 3,3'-dibromo-4,4'-dihydroxybiphenyl, bis(4-hydroxyphenyl)-methane, 2,2-bis(4-hydroxyphenyl)propane, 2,2-bis(3,5-dichloro-4-hydroxyphenyl)-propane, bis(4-hydroxyphenyl) ether, bis(4-hydroxyphenyl) sulfone, bis(4-hydroxyphenyl) ketone and bis(4-hydroxyphenyl) sulfoxide.

Hydrocarbons substituted with two hydroxy groups, or substituted with one hydroxy group and one carboxylic acid group, are normally preferred as copolymeric hydroxy components; however, halogen substituents may be present; or the component may contain, in addition to hydroxyl and carboxyl substituents, chalkogen atoms wherein each chalkogen atom is bonded to carbon or a different chalkogen atom, and no carbon is bonded to more than one chalkogen atom. Thus, the repeating units may contain ether, carbonyl, sulfide, sulfoxide, or sulfonyl radicals. A minor amount of a dicarboxylic acid or a hydroxy component carrying a metallic sulfonate salt, carboxylate salt, phosphonate salt, or the like may also be present.

The polymers of this invention therefore comprehend highly polymeric linear carbonyloxy polyesters of bifunctional compounds containing two functional groups selected from the class consisting of (a) hydroxy groups and (b) carboxylic acid groups, said bifunctional compounds consisting of (A) a hydroxy component containing at least about 75 mol percent 1,3-cyclopentanedimethanol and (B) a dicarboxylic acid component containing at least about 75 mol percent of a bis-phenylene-4,4'-dicarboxylic acid. Within the broad range of useful polymers, including lower melting polyesters suitable for molding compositions, it is generally considered that those polyesters melting above about 200° C. and as high as about 325° C. are especially advantageous for the extrusion of fibers and films. For such use, polycondensation is usually continued until the intrinsic viscosity is at least about 0.3; although polyesters having an intrinsic viscosity of as low as about 0.2 are suitable for some purposes.

The following examples will serve to illustrate typical polyesters and copolyesters derived from 1,3-cyclopentanedimethanol and the aromatic dicarboxylic acids. The examples are not intended to be limitative.

In the examples, "polymer melting temperature" is defined as the gross melting temperature determined by heating a polymer sample slowly and observing the lowest temperature at which a slight pressure causes permanent deformation of the sample. "$T_g$," the "second order transition temperature," is defined as the temperature at which a discontinuity occurs in the curve of a first derivative thermodynamic quantity with temperature. It is correlated with yield temperature and polymer fluidity and can be observed from a plot of density, specific volume, specific heat, sonic modulus, or index of refraction against temperature. $T_g$ is sometimes also known as the "glass transition temperature" because it is the temperature below which the polymer exhibits glass-like behavior; above $T_g$ the polymer is somewhat more rubber-like. A convenient method for determining $T_g$ for a given sample of polymer is disclosed by Pace in his U.S. Patent No. 2,556,295 (col. 3, line 24, to col. 4, line 19).

The term "intrinsic viscosity," as used herein, is defined as the limit of the fraction $$\frac{\ln (r)}{c}$$

as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Intrinsic viscosity is a measure of the degree of polymerization.

EXAMPLE 1

*Poly(cis-1,3-cyclopentanedimethylene 4,4'-bibenzoate)*

A polymer tube is charged with 12.2 g. (0.045 mol) of dimethyl 4,4'-bibenzoate, 12.3 g. (0.0945 mol) of cis-1,3-cyclopentanedimethanol, and 0.5 ml. of a butanol solution containing 0.034 g. of $NaHTi(OBu)_6$ as a catalyst. The ingredients are melted, after which a capillary is inserted to the bottom of the polymer tube and a flow of nitrogen into the reaction mixture is commenced at the rate of 1 ml./min. The tube is lowered into a 190° C. metal bath and ester exchange and polycondensation are carried out according to the following schedule of reaction conditions:

| Time (minutes) | Temp. (° C.) | Remarks |
| --- | --- | --- |
| 0 | 190 | Methanol distilled over at atmospheric pressure. |
| 70 | 210 | |
| 150 | 225 | |
| 210 | 225 | Partial vacuum applied. |
| 240 | 225 | Pressure=2 mm. of Hg. |
| 255 | 280 | Do. |
| 555 | 280 | Reaction stopped. |

The poly(cis-1,3-cyclopentanedimenthylene 4,4'-bibenzoate) thus prepared has an intrinsic viscosity of 0.68, a $T_g$ of 65° C., and a polymer melting temperature of 235–237° C. A clear, tough drawable film is readily melt pressed from the polymer. The pressed film is soluble in perchloroethylene, indicating that the film is amorphous. When the film is heated in an oven at 180° C. for 5 minutes, it becomes insoluble in perchloroethylene, indicating that it has become crystalline. It exhibits good resistance to photodegradation, as determined by exposure to ultraviolet light from a xenon arc source.

EXAMPLE 2

*Fibers of poly(cis-1,3-cyclopentanedimethylene 4,4'-bibenzoate)*

A molten sample of the poly(cis-1,3-cyclopentanedimethylene 4,4'-bibenzoate) of Example 1 is extruded to form a filament, using conventional techniques. The filament is oriented by drawing it around a pair of rolls maintained at 100° C. between which is situated a ceramic pin, using a draw ratio of 3.0×. The drawn filament is heat treated by boiling it in water for 15 minutes, heating it in an oven at 180° C. for 3 minutes, and finally immersing it in boiling water again for 15 minutes. The heat-treated filament has a tenacity of 1.2 g.p.d., an elongation of 13.7%, and an initial modulus of 34.0 g.p.d. Values for "tensile strain recovery" (TSR) and "moduli relaxation index" (MRI) are 66% and 0.148, respectively. The filament is insoluble in perchloroethylene and other common dry cleaning solvents.

The TSR of a filament is determined by mounting a 10-inch length of the filament on a tensile tester with a recording chart (commercialy available from the Instron Engineering Corporation, Quincy, Mass.), and also equipped with a circulating water bath which can be raised and lowered. The water bath, maintained at 40 C., is raised to immerse the filament. After the filament has been immersed for 2 minutes without tension, it is stretched in the water bath at an elongation rate of 1 inch per minute. Upon reaching the desired total elongation, the sample is held at constant length for an additional 2 minutes and the water bath is removed. The load on the filament is then reduced to a value of 0.042 g.p.d. and the filament is allowed to retract. Per cent recovery is calculated from the formula:

$$\frac{\text{units of retraction}}{\text{units of elongation}} \times 100\%$$

This procedure is carried out for elongations of 0.5, 1, 2 and 3%, and a graph is prepared by plotting the percent recovery against total elongation in the range 0–3%. TSR values are average percent recovery values from the range 0–3% elongation which may be determined from the graph by usual graphical averaging procedurees. Filaments having TSR values of 60% are considered to have good tensile recovery.

The MRI of a filament is determined by mounting a 10-inch length of the filament on a tensile tester of the above type, except that the tester is additionally equipped with a tube heater surrounding the filament. The filament is first heated for 4 minutes at 70° C. with the tube heater, after which it is stretched while hot to an extension of 1%±0.05%. Upon reaching 1% elongation, the sample is held at constant length for about 1 minute, still at 70° C., during which time the force required to maintain the filament at this extension is recorded on the chart. The cross head of the tensile tester is then returned to its original position, leaving the filament with a small amount of slack. The circulating water bath, maintained at 70° C., is raised so that the filament is submerged. After the sample has been heated in water for 4 minutes at this temperature, the slack is taken up and the sample is stretched again to 1%±0.05% elongation. The cross head is then finally returned again to its original position. Data are then taken from the chart of the tensile tester to calculate the dry and wet moduli and the loss factor, as follows:

$$G_{(dry)} = \frac{F_a}{denier} \times \frac{100}{percent\ extension}$$

$$G_{(wet)} = \frac{F_a'}{denier} \times \frac{100}{percent\ extension}$$

$$L = \frac{F_a - F_b}{F_a}$$

$$MRI = \frac{G_{(dry)}}{G_{(wet)}} \times L$$

where $G_{(dry)}$ is the dry modulus and $G_{(wet)}$ is the wet modulus, $F_a$ is the initial force required to achieve 1% elongation in the dry filament and $F_a'$ is the initial force required to achieve 1% elongation in the wet filament, $F_b$ is the force required to maintain the dry filament at constant 1% elongation 45 seconds after 1% elongation is initially achieved, and L is the loss factor. Low values of MRI are indicative of a high predicted fabric recovery, especially values below 0.2. Comparative MRI values for commercial 6-6 nylon and polyethylene terephthalate fibers are 0.9 and 0.2, respectively.

EXAMPLE 3

*Copolyester fibers and films of improved dyeability with basic dyes*

The procedure described in Example 1 for preparation of poly(cis-1,3-cyclopentanedimethylene 4,4'-bibenzoate) is repeated, substituting in place of the dimethyl 4,4'-bibenzoate a mixture of 0.0439 mol of dimethyl 4,4'-bibenzoate and 0.0011 mol of sodium 3,5-di(carbomethoxy) benzenesulfonate. The product, poly[cis-1,3-cyclopentanedimethylene 4,4' - bibenzoate/5 - (sodium sulfo)isophthalate], 9.75/2.5 mol percent, yields a clear, tough, drawable film which exhibits greatly enhanced dyeability with Fuschine SBP dye (C.I. 42,510) and other basic dyes as contrasted with the corresponding homopolyester film of Example 1, which has virtually no affinity for these basic dyes. Orientable fibers dyeable with basic dyes can be pulled from the copolyester melt.

EXAMPLE 4

*Copolyester fibers and films of improved dyeability with disperse dyes*

The procedure described in Example 1 for preparation of poly(cis-1,3-cyclopentanedimethylene 4,4'-bibenzoate) is repeated, substituting in the place of the dimethyl 4,4'-bibenzoate a mixture of 0.0405 mol of dimethyl 4,4'-bibenzoate and 0.0045 mol of dimethyl dodecahydro-4,4'-bibenzoate. The product, poly(cis-1,3-cyclopentanedimethylene 4,4'-bibenzoate/dodecahydro-4,4'-bibenzoate), 90/10 mol percent, yields a clear, tough, drawable film which exhibits enhanced dyeability with 1,4-diamino-2,3-dichloroanthraquinone (a violet disperse dye) and other disperse dyes as contrasted with the corresponding homopolyester film of Example 1. Orientable fibers dyeable with disperse dyes can be formed from the molten copolyester.

EXAMPLE 5

*Poly(cis-1,3-cyclopentanedimethylene 4,4'-sulfonyldibenzoate)*

A polymer tube is charged with 11.0 g. (0.033 mol) of bis(4-carbomethoxyphenyl) sulfone, 9.1 g. (0.070 mol) of cis-1,3-cyclopentanedimethanol, and 0.5 ml. of a butanol solution containing 0.034 g. of NaHTi(OBu)$_6$ as a catalyst. The general procedure of Example 1 is repeated, ester exchange being carried out at 205° C. for 1.25 hours and polycondensation at 280° C. under 0.5 mm. of Hg for 4.5 hours. Flexible films are melt pressed from the resulting poly(cis-1,3-cyclopentanedimethylene 4,4'-sulfonyldibenzoate, which has an intrinsic viscosity of 0.4 and a polymer melting temperature of 210–225° C. Orientable fibers can be prepared from the melt.

The polyesters of this invention are characterized by recurring structural units which contain a cyclopentane ring. As disclosed previously, it is generally desirable that at least 75 mol percent, and preferably greater than 90 mol percent, of the hydroxy components of the structural units are esters of 1,3-cyclopentanedimethanol. The presence of this 5-membered ring in the designated polyesters provides a surprising improvement in fiber-forming properties over polyesters which differ in containing the corresponding 6-membered ring, as the following experiment shows:

The general procedure of Example 1 was repeated, using a charge of 20.0 g. (0.074 mol) of dimethyl 4,4'-bibenzoate, 23.0 g. (0.160 mol) of 1,4-hexahydroxylylene glycol (mixture comprising 30% cis- and 70% transforms), and 0.5 ml. of a butanol solution containing 0.034 g. of sodium hydrogen hexabutoxytitanate, NaHTi(OBu)$_6$. Ester exchange was carried out at 200–220° C. for 1.5 hours and polycondensation at 280° C. for one hour, during which time the polymer solidified. The solid polymer was ground up and heated for 21 hours at 220° C. under a vacuum of 0.5 mm. of mercury. At the conclusion of this solid phase poymerization reaction, the intrinsic viscosity of the polymer was 0.45, and the polymer melting temperature was 329° C. with observed darkening of the polymer. The polymer was melt spun to form filaments, which were of an extremely crystalline nature, however. The crystallinity of the extruded polymer was of such a high degree that neither fine denier filaments nor heavy denier filaments could be wound up to form a yarn package. The filaments could not be oriented by drawing them.

An essential characteristic of the polyesters of this invention is that a majority of the recurring structural units (preferably greater than 90%) are esters formed from 1,3-cyclopentanedimethanol and a bis-phenylene-4,4'-dicarboxylic acid. As disclosed previously, at least 75% of all recurring ester units should, in general, be derived from the designated class of bis-phenylene-4,4'-dicarboxylic acids. The properties of the polyesters of this invention are unexpectedly superior to those of the corresponding poly(1,3-cyclopentanedimethylene terephalate), as shown by the following experiment:

The general procedure of Example 1 was repeated using a charge of 3.1 g. (0.0161 mol) of dimethyl terephthalate, 4.4 g. (0.0338 mol) of cis-1,3-cyclopentanedimethanol, and 0.5 ml. of a butanol solution containing 0.034 g. of NaHTi(OBu)$_6$. Ester exchange was carried out at 180° C. for 45 minutes and polycondensation at 280° C. for 3.5 hours under a vacuum of 0.5 mm. The polymer thus prepared had an intrinsic viscosity of 0.55 and a polymer melting temperature of 205° C. However, the polymer was amorphous as shown by the ease with which it was dissolved by methylene chloride and other chlorinated solvents. Slow deposition of the polymer from methylene chloride solution did not induce crystallinity in the polymer, which subsequently exhibited no change in polymer melting temperature and remained soluble in chlorinated solvents. Filaments pulled from the polymer melt were likewise soluble in chlorinated solvents.

Since many different embodiments of the invention may be made without departing from the spirit and scope thereof, it is to be understood that the invention is not limited by the specific illustrations except to the extent defined in the following claims.

I claim:

1. A linear condensation polyester of dihydroxy and dicarboxylic bifunctional components wherein greater than 90% of the recurring structural ester units are 1,3-cyclopentanedimethanol esters of a bis-phenylene-4,4'-dicarboxylic acid, said acid being essentially hydrocarbon except for the two carboxyl groups and of 8 to 14 carbon atoms, the polyester having an intrinsic viscosity of at least 0.3 as measured in a mixture of 1 part trifluoroacetic acid and 3 parts methylene chloride by volume at 25° C., and having a polymer melting temperature between about 200° and 325° C.

2. A polyester as defined in claim 1 wherein said bisphenylene-4,4'-dicarboxylic acid is 4,4'-bibenzoic acid.

3. A polyester consisting essentially of poly(1,3-cyclopentanedimethylene 4,4'-bibenzoate), capable of being melt spun at a temperature between about 235° and 325° C. to form orientable, crystallizable fibers.

4. A fiber of the polyester defined in claim 1.
5. A fiber of the polyester defined in claim 2.
6. A fiber of the polyester defined in claim 3.
7. A film of the polyester defined in claim 1.
8. A film of the polyester defined in claim 2.
9. A film of the polyester defined in claim 3.

References Cited by the Examiner

UNITED STATES PATENTS

| | | | |
|---|---|---|---|
| 3,007,900 | 11/61 | Lytton | 260—75 |
| 3,008,933 | 11/61 | Wielicki | 260—75 |

OTHER REFERENCES

Journal of the Chemical Society, article by Owen et al., pp. 2383–2390. July 1955, London.

WILLIAM H. SHORT, *Primary Examiner.*

LOUISE P. QUAST, *Examiner.*